United States Patent Office 2,750,202
Patented June 12, 1956

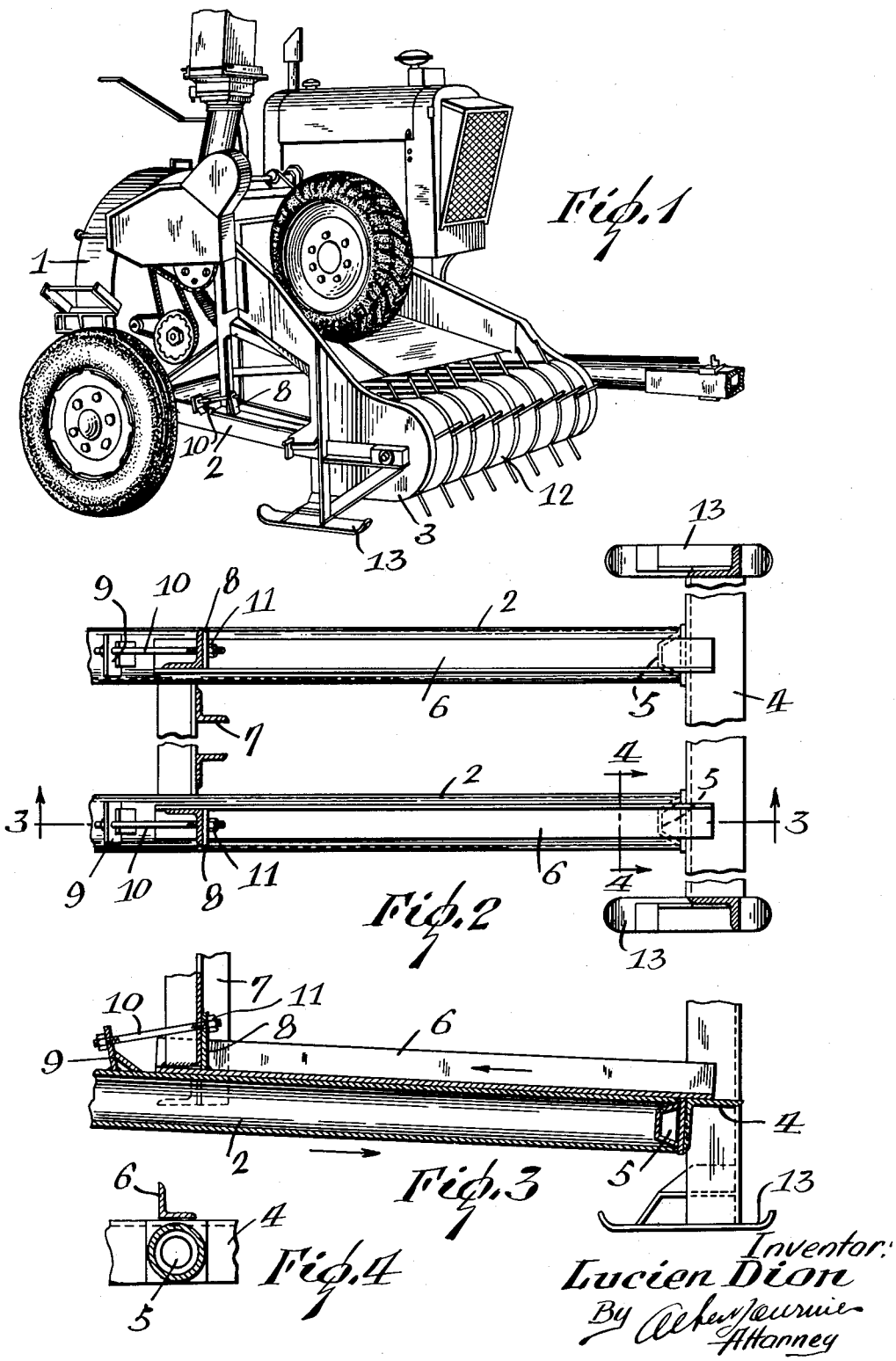

2,750,202

TRACTOR HITCH HAVING A DETACHABLE IMPLEMENT CARRYING FRAME

Lucien Dion, Ste. Therese de Blainville, Quebec, Canada, assignor to Dion Freres Inc., Ste. Therese de Blainville, Quebec, Canada Application October 12, 1953, Serial No. 385,618

6 Claims. (Cl. 280—106)

The present invention pertains to a novel agricultural vehicle, and the principal object is to provide a construction that permits interchangeability of working attachments thereto. For example, a picker drum may be replaced by some other working appliance.

Another object is to provide a simple, economical and easily operated construction for the purpose set forth. A further object is to enable the use of a single tractor on power unit for the purpose set forth.

In the accomplishment of these objects, the chassis of the tractor includes a pair of forwardly extending tubular members. The frame of the attached appliance includes a cross bar with locating plugs received in the open front ends of the tubular members. Longitudinal members extend rearward from the cross bar and are detachably secured to the chassis and to the rearward positions of the tubular members which are exposed rearward of the longitudinal members.

More particularly in this connection, the longitudinal members engage vertical members on the chassis. The exposed portions of the tubular members carry brackets detachably fastened to the vertical members and plates by bolts passed through all the parts. An appliance is detached by merely removing the nuts from the bolts and withdrawing the appliance. Another appliance having a similar frame structure is mounted in the manner already indicated.

The invention is fully disclosed by way of example in the following description and in the accompanying drawings in which:

Figure 1 is a perspective view of the device;
Figure 2 is a plan section of the frame structure;
Figure 3 is a section on the line 3—3 of Figure 2; and
Figure 4 is a section on the line 4—4 of Figure 2.

Reference to these views will now be made by use of like characters which are employed to designate corresponding parts throughout.

In Figure 1 is shown a vehicle or tractor 1 having a pair of tubular side rails 2 extending forwardly therefrom as a part of the chassis. Various attachments are to be mounted interchangeably at the front ends of the rails.

In the illustrated case the attachment includes side plates 3 joined by an angle iron cross bar 4. The bar carries a pair of truncated conical plugs 5 adapted for insertion in the front ends of the tubes 2 as shown more clearly in Figures 3 and 4.

On the cross bar 4 are welded a pair of angle irons 6 extending rearwardly therefrom and lying unattached on the tubes 1. The chassis includes also a pair of vertical angle members 7 having their lower ends lying directly over the rear ends of the members 6. Each member 6 carries a vertical plate 8 secured thereto and engaging the corresponding member 7 in surface contact.

Rearward of the members 7, the tubes 2 are exposed beyond the members 6. Each exposed portion of the tubes 2 carries a bracket 9 firmly welded thereon. A bolt 10 is passed through each bracket 9 and the corresponding member 7 and plate 8. The parts are clamped together by nuts 11 on the ends of the bolts 10, engaging the outer surfaces of the members 8 and 9 respectively.

The plates 3 may carry, for example, a picker drum 12. The plates and drum are supported from the ground by runners 13 suitably attached to the plates. The runners may be replaced by wheels if desired.

If it is desired to remove the rear assembly carrying the drum 12, the nuts at one or both ends of the bolts 10 are removed. The front assembly, which includes also the members 4 and 6, is now withdrawn, whereupon the plugs 5 are retracted from the tubes 2.

A different appliance to be attached would have the same frame structure. The plugs 5 serve as locating devices to facilitate mounting. The rearward end is assembled at the bolts 10 in the manner described.

Although a specific embodiment of the invention has been illustrated and described, it will be understood that various alterations in the details of construction may be made without departing from the scope of the invention as indicated by the appended claims.

What I claim is:

1. In a tractor hitch, a chassis having a pair of tubular longitudinal members, a detachable frame including a cross bar, a pair of locating plugs on said bar and detachably fitted in the front ends of said members, a pair of longitudinal members extending from said cross bar and lying over the first named members, and means for attaching the second named members to said chassis.

2. In a tractor hitch, a chassis having a pair of tubular longitudinal members, a detachable frame including a cross bar, a pair of locating plugs on said bar and detachably fitted in the front ends of said members, a pair of longitudinal members extending from said cross bar and lying over the first named members, ground engaging members carried by said cross bar, and means for attaching the second named members to said chassis.

3. In a tractor hitch, a chassis having a pair of tubular longitudinal members, a detachable frame including a cross bar, a pair of locating plugs on said bar and detachably fitted in the front ends of said members, a pair of longitudinal members extending from said cross bar and lying over the first named members, vertical members on said chassis over the second named members, plates on the second named members and engaging the vertical members, and detachable means passing through said vertical members and joining said plates to said tubular members.

4. In a tractor hitch, a chassis having a pair of tubular longitudinal members, a detachable frame including a cross bar, a pair of locating plugs on said bar and received in the front ends of said members, a pair of longitudinal members extending from said cross bar and lying over the first named members, vertical members on said chassis over the second named members, plates on the second named members and engaging the vertical members, brackets on said tubular members rearward of the second named members, a bolt passing through the vertical member, plate and bracket along each tubular member, and nuts on the ends of each bolt.

5. In a tractor hitch, a chassis having a pair of tubular longitudinal members, a detachable frame including a cross bar, a pair of locating plugs on said bar and detachably fitted in the front ends of said members, a pair of longitudinal members extending from said cross bar and lying over the first named members, vertical members on said chassis over the second named members, plates on the second named members and engaging the vertical members, detachable means passing through said vertical members and joining said plates to said tubular members, ground engaging members carried by said cross bar, and means for attaching the second named members to said chassis.

6. In a tractor hitch, a chassis having a pair of tubular longitudinal members, a detachable frame including a cross bar, a pair of locating plugs on said bar and received in the front ends of said members, a pair of longitudinal members extending from said cross bar and lying over the first named members, vertical members on said chassis over the second named members, plates on the second named members and engaging the vertical members, brackets on said tubular members rearward of the second named members, a bolt passing through the vertical member, plate and bracket along each tubular member, nuts on the ends of each bolt, ground engaging members carried by said cross bar, and means for attaching the second named members to said chassis.

References Cited in the file of this patent

UNITED STATES PATENTS

| | | |
|---|---|---|
| 2,327,193 | Klauer | Aug. 17, 1943 |
| 2,489,274 | Donald | Nov. 29, 1949 |